(12) United States Patent
Kitagawa et al.

(10) Patent No.: US 9,273,378 B2
(45) Date of Patent: Mar. 1, 2016

(54) FINE SOLID SOLUTION ALLOY PARTICLES AND METHOD FOR PRODUCING SAME

(75) Inventors: Hiroshi Kitagawa, Nara (JP); Kohei Kusada, Fukuoka (JP); Rie Makiura, Fukuoka (JP)

(73) Assignee: Japan Science and Technology Agency, Saitama (JP)

( * ) Notice: Subject to any disclaimer, the term of this patent is extended or adjusted under 35 U.S.C. 154(b) by 1105 days.

(21) Appl. No.: 13/265,265

(22) PCT Filed: Apr. 23, 2010

(86) PCT No.: PCT/JP2010/002962
§ 371 (c)(1),
(2), (4) Date: Jan. 9, 2012

(87) PCT Pub. No.: WO2010/122811
PCT Pub. Date: Oct. 28, 2010

(65) Prior Publication Data
US 2012/0094140 A1    Apr. 19, 2012

(30) Foreign Application Priority Data

Apr. 24, 2009    (JP) .................................. 2009-106171

(51) Int. Cl.
*B22F 9/24*    (2006.01)
*C22C 5/02*    (2006.01)
*B22F 1/00*    (2006.01)
*B82Y 30/00*    (2011.01)
(Continued)

(52) U.S. Cl.
CPC .................. *C22C 5/02* (2013.01); *B22F 1/0018* (2013.01); *B22F 9/24* (2013.01); *B82Y 30/00* (2013.01); *C22C 5/04* (2013.01); *C22C 5/06* (2013.01); *Y10T 428/12* (2015.01)

(58) Field of Classification Search
CPC ....................................................... B22F 1/0018
USPC ............................................................ 75/351
See application file for complete search history.

(56) References Cited

U.S. PATENT DOCUMENTS 3,172,753 A * 3/1965 Walsh .............................. 75/363
4,678,505 A * 7/1987 Bushey ........................... 75/351
(Continued)

FOREIGN PATENT DOCUMENTS

| JP | 4-028801 | 1/1992 |
| JP | 2005-272970 | 10/2005 |

(Continued)

OTHER PUBLICATIONS

Machine English translation of 1993-198878, Jul. 1993.*
(Continued)

*Primary Examiner* — George Wyszomierski
*Assistant Examiner* — Ngoclan T Mai
(74) *Attorney, Agent, or Firm* — Hamre, Schumann, Mueller & Larson, P.C.

(57) ABSTRACT

The alloy fine particles of the present invention are fine particles of a solid solution alloy, in which a plurality of metal elements are mixed at the atomic level. The production method of the present invention is a method for producing alloy fine particles composed of a plurality of metal elements. This production method includes the steps of: (i) preparing a solution containing ions of the plurality of metal elements and a liquid containing a reducing agent; and (ii) mixing the solution with the liquid that has been heated.

17 Claims, 19 Drawing Sheets

(51) Int. Cl.
*C22C 5/04* (2006.01)
*C22C 5/06* (2006.01)

(56) References Cited

U.S. PATENT DOCUMENTS

| | | | |
|---|---|---|---|
| 7,479,469 B2* | 1/2009 | Ishihara et al. | 502/185 |
| 2004/0016914 A1* | 1/2004 | Matsuda et al. | 252/500 |
| 2007/0034052 A1* | 2/2007 | Vanheusden et al. | 75/362 |

FOREIGN PATENT DOCUMENTS

| | | |
|---|---|---|
| JP | 2007-100117 | 4/2007 |
| JP | 2007-239053 | 9/2007 |
| JP | 2010-100899 | 5/2010 |

OTHER PUBLICATIONS

Kusada, et al., "Synthesis and Hydrogen-Storage Properties of Ag—Rh Alloy Nanoparticles", The 2$^{nd}$ Annual Meeting of Japan Society for Molecular Science 2008, Fukuoka Program, IP030, Sep. 24, 2008, with translation.

Kusada, et al., "Synthesis and Hydrogen-Storage Properties of Ag—Rh Alloy Nanoparticles", Meeting Abstracts of the Physical Society of Japan, vol. 63, issue 2 (2008 Autumn Meeting) Pt. 4, p. 894, 23pVE4, Aug. 25, 2008, with translation.

Kusada, et al., "Synthesis and Hydrogen-Storage Properties of Ag—Rh Alloy Nanoparticles", The Chemical Society of Japan, the 88$^{th}$ Annual Spring Meeting, Meeting Abstracts I, p. 433, 4 L2-36, Mar. 12, 2008, with translation.

Kusada, et al., "Synthesis and Hydrogen-Storage Properties of Ag—Rh Alloy Nanoparticles" Meeting Abstracts of the 6$^{th}$ Society of Nano Science and Technology, p. 242, PS2-044, May 7, 2008, with translation.

Yamauchi, et al., "Structural Change of Ag—Rh Alloy Nanoparticles by Hydrogen Absorption/Desorption Cycles", The Chemical Society of Japan, the 89$^{th}$ Annual Spring Meeting, Meeting Abstracts I, p. 175, 2 D2-42, 2009.

* cited by examiner

Average particle size 12.5±2.6 nm

FINE SOLID SOLUTION ALLOY PARTICLES AND METHOD FOR PRODUCING SAME

TECHNICAL FIELD

The present invention relates to solid solution alloy fine particles and a method for producing the same.

BACKGROUND ART

Alloys exhibit different properties from those of individual constituent metal elements. Therefore, newly developed alloys are expected to have properties (for example, catalytic properties) that conventional metals do not have. On the other hand, metal fine particles are expected to have a variety of applications for reasons such as their large specific areas and possibly different properties and structures from those of bulk metals. For these reasons, various alloy fine particles have been studied. For example, a method for producing alloy particles containing silver and rhodium is disclosed (see Non Patent Literature 1).

CITATION LIST

Non Patent Literature

Non Patent Literature 1
  Paper No. 4L2-36, Proceedings (I) of the 88th Spring Meeting of The Chemical Society of Japan, 2008

SUMMARY OF INVENTION

Technical Problem

As shown in a phase diagram of FIG. 18, however, silver and rhodium in bulk form do not form a solid solution at the atomic level. Even if a mixture of silver and rhodium is heated and melted, silver and rhodium remain separated. Therefore, even if a melt containing silver and rhodium is cooled rapidly, it is difficult to produce an alloy in which silver and rhodium form a solid solution. On the other hand, in the method of Non Patent Literature 1, silver ions and rhodium ions are reduced in a solution to produce fine particles. In this method of Non Patent Literature 1, however, it is difficult to produce fine particles in which silver and rhodium form a solid solution at the atomic level. Nevertheless, if silver and rhodium do not form a solid solution at the atomic level, the resulting alloy is unlikely to exhibit its unique properties. FIG. 19 shows a phase diagram of gold and rhodium. As is clear from the phase diagram of FIG. 19, it is difficult to produce a solid solution alloy of gold and rhodium.

Under these circumstances, it is one of the objects of the present invention to provide alloy fine particles in which a plurality of metal elements are mixed at the atomic level and a method for producing the same.

Solution to Problem

In order to achieve the above object, the alloy fine particles of the present invention are fine particles of a solid solution alloy, in which a plurality of metal elements are mixed at the atomic level. The phrase "mixed at the atomic level" means that, in one aspect, individual elements are randomly dispersed in an elemental map obtained using a STEM with a spatial resolution of 0.105 nm, and in another aspect, a single peak pattern is observed by XRD.

The production method of the present invention is a method for producing alloy fine particles composed of a plurality of metal elements. This production method includes the steps of: (i) preparing a solution containing ions of the plurality of metal elements and a liquid containing a reducing agent; and (ii) mixing the solution with the liquid that has been heated.

Advantageous Effects of Invention

According to the present invention, solid solution alloy fine particles in which a plurality of metal elements are mixed at the atomic level are obtained.

DESCRIPTION OF EMBODIMENTS

Figure 1:
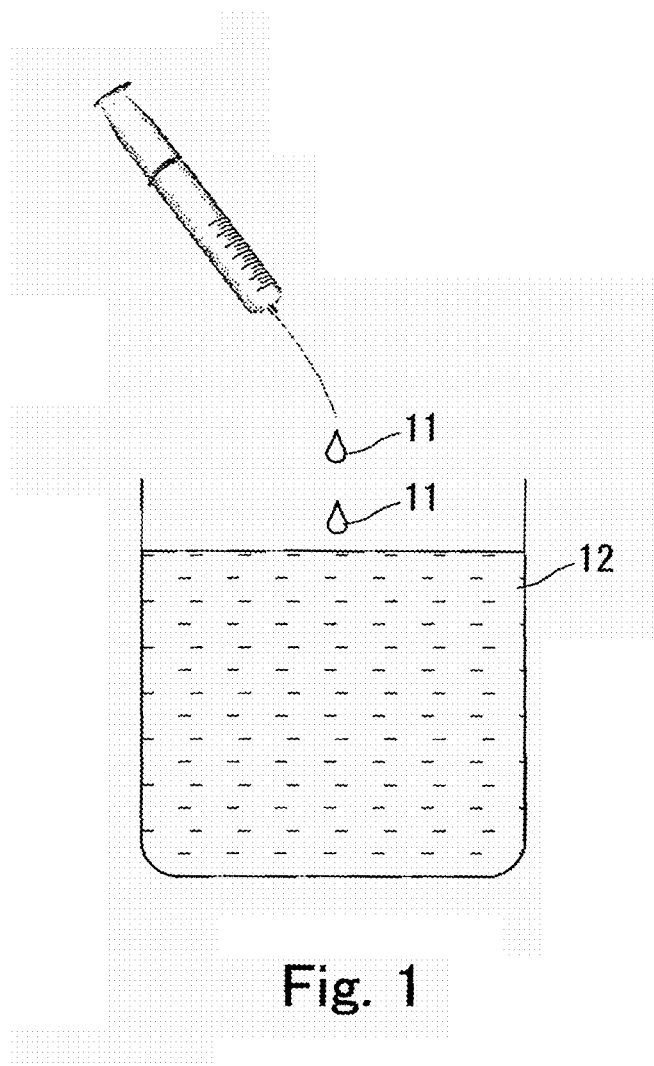
FIG. 1 shows an example of a step of the production method of the present invention.

Hereinbelow, embodiments of the present invention will be described by way of examples. The present invention is not limited to the following embodiments and examples. In the following description, specific numerical values or specific materials may be given by way of examples, but other numerical values or other materials may be used as long as the effect of the present invention can be obtained.

[Production Method of Alloy Fine Particles]

The method of the present invention is a method for producing alloy fine particles composed of a plurality of metal elements. According to this production method, solid solution alloy fine particles in which a plurality of metal elements are mixed at the atomic level are obtained. The alloy fine particles obtained by this production method constitute one aspect of the alloy fine particles of the present invention.

The method of the present invention includes the following steps (i) and (ii). Hereinafter, the plurality of metal elements that constitute the alloy fine particles may sometimes be referred to as "a plurality of metal elements (E)".

In the step (i), a solution containing ions of the plurality of metal elements (E) and a liquid containing a reducing agent are prepared. Hereinafter, the solution containing the plurality of metal elements (E) may sometimes be referred to as a "metal ion solution" or a "solution 11". The liquid containing a reducing agent may sometimes be referred to as a "liquid 12".

The plurality of metal elements (E) may be two kinds of metal elements. In that case, binary alloy fine particles are obtained. When the plurality of metal elements (E) include rhodium, rhodium alloy fine particles are obtained.

An example of the plurality of metal elements (E) is a combination of silver (Ag) and rhodium (Rh). Another example of the plurality of metal elements (E) is a combination of gold (Au) and rhodium (Rh).

The metal ion solution can be prepared by dissolving at least one type of compound containing the plurality of metal elements (E) in a solvent. One compound may contain all the metal elements included in the plurality of metal elements (E). One compound also may contain only one metal element included in the plurality of metal elements (E).

When the plurality of metal elements (E) are silver and rhodium, the metal ion solution can be prepared by dissolving a silver compound and a rhodium compound in a solvent. Examples of the silver compound include silver (I) acetate ($AgCH_3COO$) and silver nitrate ($AgNO_3$). Examples of the rhodium compound include rhodium (III) acetate ($Rh(CH_3COO)_3$) and rhodium (II) acetate ($Rh(CH_3COO)_2$). As the solvent, a solvent capable of dissolving silver ions and rhodium ions is used. An example of the solvent is water.

When the plurality of metal elements (E) are gold and rhodium, the metal ion solution can be prepared by dissolving a gold compound and a rhodium compound in a solvent. Examples of the gold compound include chloroauric acid ($HAuCl_4$). Examples of the rhodium compound include the above-mentioned rhodium compounds and rhodium (III) chloride ($RhCl_3$). An example of the solvent is water.

The concentration of ions of one of the plurality of metal elements (for example, silver ions or gold ions) in the metal ion solution may be in the range of 0.1 mmol/L to 1 mol/L (for example, in the range of 0.1 mmol/L to 5 mmol/L). The concentration of rhodium ions in the metal ion solution may be in the range of 0.1 mmol/L to 1 mol/L (for example, in the range of 0.1 mmol/L to 5 mmol/L or in the range of 0.1 mmol/L to 1 mmol/L).

The alloy composition can be varied by varying the ratio between the concentration of silver ions $C_{Ag}$ (mol/L) in the metal ion solution and the concentration of rhodium ions $C_{Rh}$ (mol/L) in the metal ion solution. The value of $C_{Rh}/[C_{Rh}+C_{Ag}]$ may be 0.1 or more, 0.2 or more, 0.3 or more, 0.4 or more, 0.5 or more, 0.6 or more, 0.7 or more, 0.8 or more, or 0.9 or more. The value may also be 0.9 or less, 0.8 or less, 0.7 or less, 0.6 or less, 0.5 or less, 0.4 or less, 0.3 or less, 0.2 or less, or 0.1 or less. The use of a metal ion solution with $C_{Rh}/[C_{Rh}+C_{Ag}]=X$ makes it possible to produce alloy fine particles having a rhodium content of almost 100× atomic %. For example, with the use of a metal ion solution with a $C_{Rh}/[C_{Rh}+C_{Ag}]$ value of 0.5 or more, alloy fine particles having a rhodium content of 50 atomic % or more can be produced. When the plurality of metal elements (E) are two kinds of elements, the relationship between the concentrations of ions of the individual elements in the metal ion solution and the resulting alloy composition is the same as the above-mentioned relationship between the concentrations of silver ions and rhodium ions and the resulting alloy composition.

Next, in the step (ii), the metal ion solution (solution 11) is mixed with the heated liquid (liquid 12) containing a reducing agent. In the step (ii), not only the liquid 12 but also the solution 11 may be heated.

Figure 2:
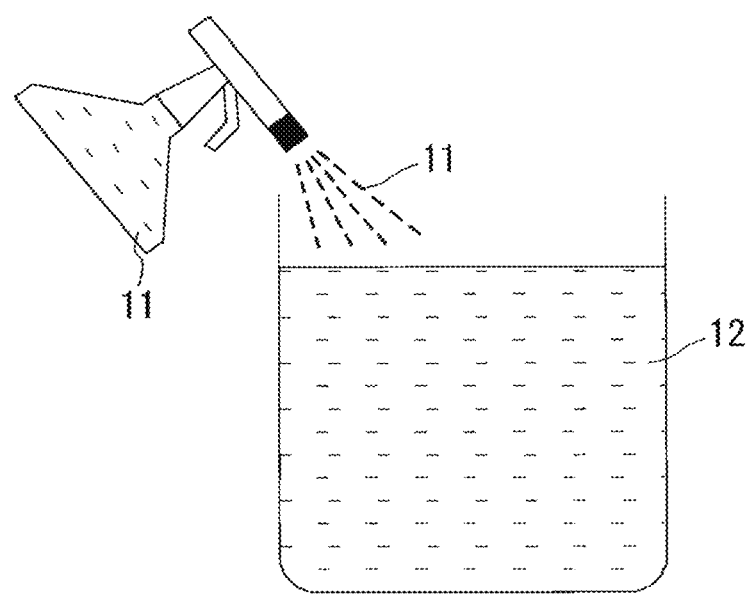
FIG. 2 shows another example of the step of the production method of the present invention.

In the step (ii), the solution 11 may be mixed with the liquid 12 by dropping the solution 11 into the heated liquid 12. In the step (ii), the solution 11 may be mixed with the liquid 12 by spraying the solution 11 onto the heated liquid 12. For example, in the step (ii), as shown in FIG. 1, the solution 11 and the heated liquid 12 may be mixed by dropping the former into the latter. In the step (ii), as shown in FIG. 2, the solution 11 and the heated liquid 12 may be mixed by spraying the former onto the latter. When the concentration of metal ions in the metal ion solution is high, it may be preferable in some cases to mix the solution 11 and the liquid 12 by spraying the solution 11.

In the step (ii), the solution 11 may be mixed with the liquid 12 that has been heated to a temperature not lower than a temperature at which each of the ions of the plurality of metal elements (E) is reduced. Furthermore, in the step (ii), the solution 11 may be mixed with the liquid 12 that has been heated to a temperature higher by 20° C. or more than a temperature at which each of the ions of the plurality of metal elements (E) is reduced. In these two cases, the reducing agent may be ethylene glycol.

Spraying of the solution 11 and/or the liquid 12 can be performed, for example, using a spray gun or an ink jet head. The particle size of the alloy fine particles to be formed may possibly be controlled by varying the size of sprayed droplets.

The reducing agent contained in the liquid 12 may be alcohol. The liquid 12 as a solvent may consist of an alcohol acting as a reducing agent (for example, ethylene glycol). The liquid 12 may contain an alcohol not acting as a reducing agent in addition to an alcohol acting as a reducing agent. When the liquid 12 is heated, the action of the alcohol as a reducing agent is increased. The temperature to which the liquid 12 is heated in the step (ii) depends on the type of alcohol as a reducing agent contained in the liquid 12. For example, when ethylene glycol is used, it is assumed that silver ions are reduced at 100° C. or lower and rhodium ions are reduced at around 140° C. Therefore, when the plurality of metal elements (E) are silver and rhodium and ethylene glycol is used as a reducing agent, the liquid 12 must be heated to 140° C. or higher.

There is no limitation on the type of alcohol as a reducing agent contained in the liquid 12 as long as the effect of the present invention can be obtained. The alcohol used as a reducing agent may be a monovalent alcohol, or a polyvalent alcohol such as a divalent alcohol. Preferred examples of the alcohol used as a reducing agent are at least one type of alcohol selected from the group consisting of ethylene glycol, diethylene glycol, and triethylene glycol. Hereinafter, at least one type of alcohol selected from the group consisting of ethylene glycol, diethylene glycol, and triethylene glycol may sometimes be referred to as "ethylene glycols". The boiling point of ethylene glycols is 190° C. or higher. Therefore, the use of such an alcohol as a solvent makes it possible to produce alloy fine particles at a high temperature.

Instead of the alcohol (i.e. an alcohol acting as a reducing agent) contained in the liquid 12, a substance capable of reducing metal ions (such as silver ions, rhodium ions, and gold ions) and acting as a solvent may be used.

At least one selected from the solution 11 and the liquid 12 may contain a protective agent for preventing the agglomeration of the alloy fine particles. The use of a protective agent makes it easier to obtain alloy fine particles of small size. Specifically, both or either one of the solution 11 and the liquid 12 may contain a protective agent. Examples of the protective agent include polymers and surfactants. For example, the protective agent is poly(N-vinyl-2-pyrrolidone) (hereinafter may be referred to as "polyvinylpyrrolidone" or "PVP"). The concentration of the protective agent in the solution is selected according to the type of the protective agent. When the protective agent is polyvinylpyrrolidone, it may be added so that the concentration of its constituent units (monomer units) is in the range of 0.1 mmol/L to 2 mol/L (for example, in the range of 1 mmol/L to 10 mmol/L).

When neither the solution 11 nor the liquid 12 contains a protective agent, the alloy fine particles are likely to agglomerate to form particles of larger size.

A typical example of the liquid 12 is a solution (an alcohol solution of a protective agent) obtained by dissolving the protective agent in an alcohol (for example, ethylene glycols). For example, an ethylene glycol solution in which polyvinylpyrrolidone is dissolved can be used as the liquid 12. Hereinafter, the liquid 12 in which the protective agent is dissolved may sometimes be referred to as a "reducing agent solution".

In one example, the reducing agent is ethylene glycol, the plurality of metal elements (E) are silver and rhodium, and in the step (ii), the solution 11 is mixed with the liquid 12 that has been heated to 145° C. or higher. In another example, the reducing agent is ethylene glycol, the plurality of metal elements (E) are gold and rhodium, and in the step (ii), the solution 11 is mixed with the liquid 12 that has been heated to 145° C. or higher. In these examples, the liquid 12 may be an ethylene glycol solution in which polyvinylpyrrolidone is dissolved. The solution 11 may be an aqueous solution containing silver ions and rhodium ions or an aqueous solution containing gold ions and rhodium ions.

In the production method of the present invention, the liquid 12 may be one essentially or substantially free from a reducing agent (for example, sodium borohydride ($NaBH_4$) or hydrazine) other than alcohol. However, sodium borohydride or the like may be used as a reducing agent as long as the effect of the present invention can be obtained.

When the alcohol contained in the liquid 12 is ethylene glycol, the liquid 12 may be heated to a temperature of 145° C. or higher. It may also be heated to a temperature of 150° C. or higher or 160° C. or higher. In the step (ii), the liquid 12 may be heated to a lower temperature as long as the effect of the present invention can be obtained. In the step (ii), the liquid 12 may be heated to a temperature of 200° C. or lower, for example, 50° C. or lower.

In the step (ii), the solution 11 and the liquid 12 are mixed in such a way that the temperature of the liquid 12 does not drop excessively. For example, when the alcohol is ethylene glycol, the solution 11 and the liquid 12 are mixed in such a way that the temperature of the liquid 12 is maintained at 145° C. or higher, 150° C. or higher, or 160° C. or higher. A way of preventing an excessive drop in the temperature of the liquid 12 is, for example, to add the solution 11 little by little. Examples of methods of adding the solution 11 little by little include a method of dropping the solution 11 and a method of spraying the solution 11. The solution 11 may also be added after it is heated to a certain temperature.

In one example, the weight of the solution 11 to be added per second to the liquid 12 may be not more than one three-hundredth (for example, not more than one three-thousandth) of the weight of the liquid 12.

According to the production method of the present invention, solid solution alloy fine particles in which the plurality of metal elements (E) are mixed at the atomic level are obtained. For example, fine particles of a silver-rhodium solid solution alloy, in which silver and rhodium are mixed at the atomic level, are obtained. Silver and rhodium in bulk form do not form a solid solution at the atomic level. However, fine particles having a particle size of several tens of nanometers or less have different structures and properties from those of bulk metals, and it is believed that silver and rhodium therein can form a solid solution at the atomic level. Furthermore, according to the present invention, fine particles of a gold-rhodium solid solution alloy, in which gold and rhodium are mixed at the atomic level, are obtained.

Even if the plurality of metal elements (E) are a plurality of metal elements that do not form a solid solution even in the liquid phase in a phase diagram, the production method of the present invention makes it possible to obtain alloy fine particles in which the plurality of metal elements (E) form a solid solution at the atomic level. In this case, the metal ion solution may be a solution containing a plurality of metal elements whose concentrations correspond to the composition ratio of those metals in bulk form that do not form a solid solution. This production method makes it possible to obtain alloy fine particles in which a plurality of metal elements form a solid solution at the atomic level although these metal elements have a composition ratio that does not allow them to form a solid solution in the liquid phase if they are in bulk form (i.e., these metal elements include a plurality of metal elements that do not form a solid solution in the liquid phase over the entire range of composition ratios when they are in bulk form). The production method of the present invention can be used for producing various alloy fine particles.

[Alloy Fine Particles]

The alloy fine particles of the present invention are alloy fine particles in which the plurality of metal elements (E) form a solid solution. More specifically, the alloy fine particles of the present invention are solid solution alloy fine particles in which the plurality of metal elements (E) are mixed at the atomic level. The fact that they are solid solution alloy fine particles in which the plurality of metal elements (E) are mixed at the atomic level can be confirmed by measurements or the like performed in the following examples. Examples of the alloy fine particles of the present invention include rhodium alloy fine particles containing rhodium. Examples of the alloy fine particles of the present invention include silver-rhodium alloy fine particles and gold-rhodium alloy fine particles.

The alloy fine particles of the present invention can be produced by the production method of the present invention. Since the details of the production method of the present invention that have been described can be applied to the alloy fine particles of the present invention, overlapping descriptions may be omitted. Furthermore, the details of the alloy fine particles of the present invention that have been described can be applied to the production method of the present invention.

In one aspect, the alloy fine particles of the present invention are such that elemental mapping using a scanning transmission electron microscope with a resolution of 0.105 nm demonstrates that there is no phase separation in the alloy fine particles.

The alloy fine particles of the present invention (for example, binary alloy fine particles) may be such that all of the plurality of metal elements (E) are contained in any cube with a side length of 1 nm that is arbitrarily selected from the alloy fine particle.

In one aspect, the alloy fine particles of the present invention are such that X-ray diffraction demonstrates that there is no phase separation in the alloy fine particles.

In the rhodium alloy fine particles of the present invention (for example, silver-rhodium alloy fine particles and gold-rhodium alloy fine particles), the rhodium content may be 10 atomic % or more, 20 atomic % or more, 30 atomic % or more, 40 atomic % or more, 50 atomic % or more, 60 atomic % or more, 70 atomic % or more, 80 atomic % or more, or 90 atomic % or more. It may also be 90 atomic % or less, 80 atomic % or less, 70 atomic % or less, 60 atomic % or less, 50 atomic % or less, 40 atomic % or less, 30 atomic % or less, 20 atomic % or less, or 10 atomic % or less.

There is no limitation on the particle size of the alloy fine particles of the present invention as long as the plurality of metal elements (E) form a solid solution at the atomic level. The alloy fine particles of the present invention (for example, silver-rhodium alloy fine particles and gold-rhodium alloy fine particles) may have an average particle size of 30 nm or less, 20 nm or less, or 10 nm or less. The average particle size may be 3 nm or more. The average particle size can be calculated in a manner described in the examples.

The alloy fine particles of the present invention may be composed of the plurality of metal elements (E) that do not form a solid solution even in the liquid phase.

The alloy fine particles of the present invention may contain trace amounts of impurities as long as they do not essentially change the properties of the particles.

EXAMPLES

Hereinafter, the present invention will be described in more detail by way of examples. In the examples and comparative examples below, an electron microscope (JEM 2010EFE manufactured by JEOL Ltd.) and a scanning transmission electron microscope (HD-2700 manufactured by Hitachi High-Technologies Corporation) were used for EDX measurements. An X-ray diffractometer (D8 ADVANCE manufactured by Bruker AXS) and SPring-8 BL02B2 were used for XRD measurements. As a scanning transmission electron microscope, HD-2700 with a resolution of 0.105 nm, manufactured by Hitachi High-Technologies Corporation, was used. Elemental mapping was conducted with EDX. In the following examples, elemental mapping data were obtained using a scanning transmission electron microscope (HD-2700). In the elemental mapping performed in the following examples, an electron beam was scanned in two dimensions using the STEM to generate a scan image while the EDX incorporated in the STEM detected the elements, which were plotted in two dimensions with reference to the operation of the STEM to conduct the elemental mapping.

Example 1

In Example 1, silver-rhodium alloy fine particles were produced by dropping the solution 11.

First, polyvinylpyrrolidone (0.1 mmol) was dissolved in ethylene glycol (100 ml) to obtain a reducing agent solution (liquid 12). Silver acetate (0.005 mmol) and rhodium (III) acetate (0.005 mmol) were dissolved in 20 ml of pure water to obtain a metal ion solution (solution 11).

Next, the reducing agent solution was heated, and when the temperature of the reducing agent solution reached 160° C., the metal ion solution was dropped with a syringe into the reducing agent solution. At this time, the metal ion solution was dropped in such a way that the temperature of the reducing agent solution was maintained at 160° C. or higher. Next, the reducing agent solution into which the metal ion solution was dropped was centrifuged to separate the reaction product (fine particles).

Figure 3:
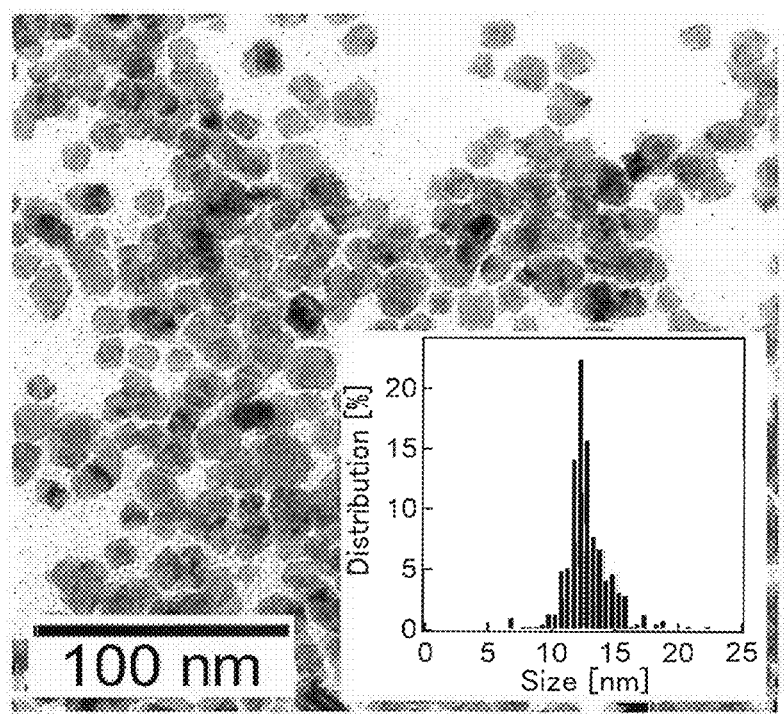
FIG. 3 shows an example of transmission electron micrographs of alloy fine particles produced in Example 1.
Figure 4:
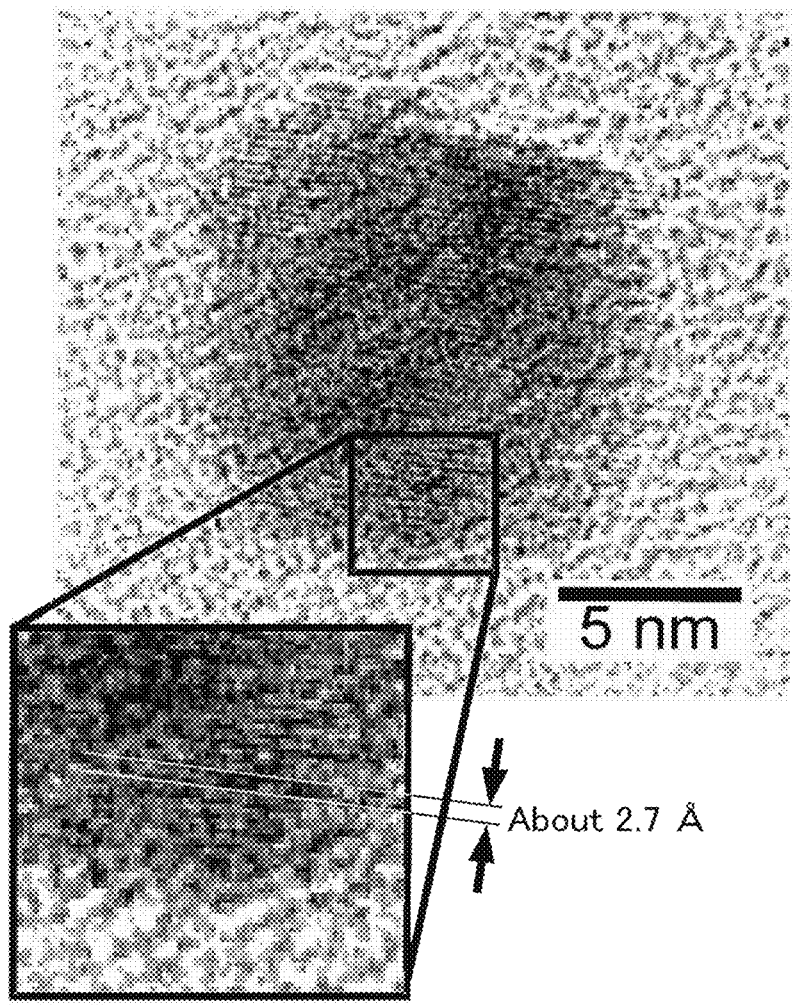
FIG. 4 shows another example of the transmission electron micrographs of the alloy fine particle produced in Example 1.

FIG. 3 shows the transmission electron micrograph and the particle size distribution of the fine particles of Example 1. As shown in FIG. 3, the fine particles having a uniform particle size were obtained. The average particle size of the fine particles of Example 1 was 12.5 nm±2.6 nm. The average particle size was calculated by actually measuring the particle sizes of (at least 300) particles in the transmission electron microscope photograph (TEM photograph) and averaging them. FIG. 4 shows the transmission electron microscope photograph of one of the fine particles of Example 1. Since regularly-spaced lattice fringes are observed across the fine particle, the fine particle in FIG. 4 is considered as a single crystal.

Figure 5:
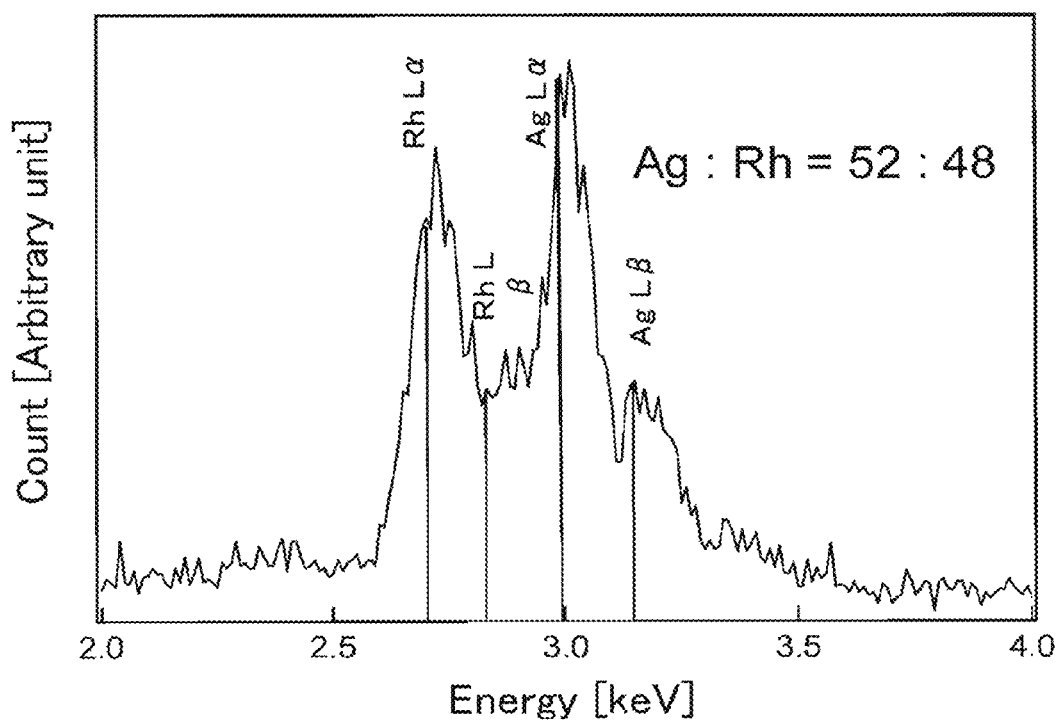
FIG. 5 shows an EDX spectrum of the alloy fine particle produced in Example 1.

FIG. 5 shows the spectrum of the fine particle shown in FIG. 4, obtained by energy-dispersive X-ray spectroscopy (EDX). The result shown in FIG. 5 indicates that silver and rhodium are present in one particle in a ratio of approximately 1:1, which demonstrates that the fine particles of Example 1 are alloy fine particles in which silver and rhodium form a solid solution at the atomic level.

Figure 6:
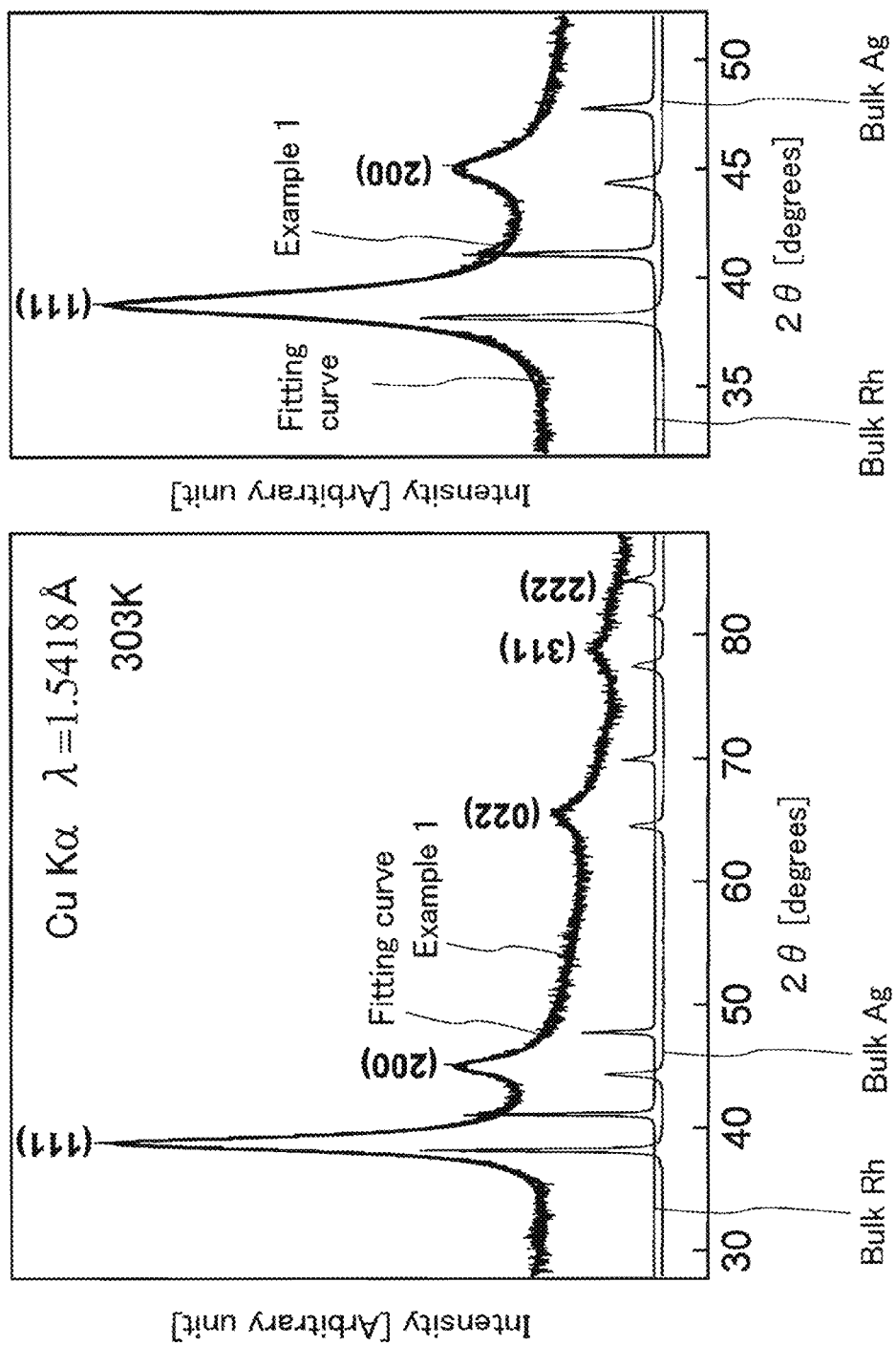
FIG. 6 shows an XRD pattern of the alloy fine particles produced in Example 1.

FIG. 6 shows the XRD pattern (X-ray diffraction pattern) of the fine particles of Example 1. The fitting curve shown in FIG. 6 is a curve obtained by assuming that the alloy fine particles of Example 1 have an fcc structure. This fitting curve coincides approximately with that of measured values, which indicates that the alloy fine particles of Example 1 have an fcc structure. Furthermore, each peak of the fine particles of Example 1 appears between the peak of bulk silver and the peak of bulk rhodium. This result also indicates that the fine particles of Example 1 are alloy fine particles in which silver and rhodium form a solid solution at the atomic level.

Example 2

In Example 2, alloy fine particles containing silver and rhodium in an atomic ratio of approximately 50:50 were produced by spraying the solution 11.

First, polyvinylpyrrolidone (1.0 mmol) was dissolved in ethylene glycol (200 ml) to obtain a reducing agent solution (liquid 12). Silver acetate (0.05 mmol) and rhodium (III) acetate (0.05 mmol) were dissolved in 20 ml of pure water to obtain a metal ion solution (solution 11).

Next, the reducing agent solution was heated, and when the temperature of the reducing agent solution reached 160° C., the metal ion solution was sprayed with a spray gun onto the reducing agent solution. At this time, the metal ion solution was sprayed in such a way that the temperature of the reducing agent solution was maintained at 160° C. or higher. Next, the reducing agent solution into which the metal ion solution was added was centrifuged to separate the reaction product (fine particles).

Example 3

In Example 3, alloy fine particles containing silver and rhodium in an atomic ratio of approximately 75:25 were produced by spraying the solution 11.

First, polyvinylpyrrolidone (1.0 mmol) was dissolved in ethylene glycol (200 ml) to obtain a reducing agent solution (liquid 12). Silver acetate (0.075 mmol) and rhodium (III) acetate (0.025 mmol) were dissolved in 20 ml of pure water to obtain a metal ion solution (solution 11).

Next, the reducing agent solution was heated, and when the temperature of the reducing agent solution reached 160° C., the metal ion solution was sprayed with a spray gun onto the reducing agent solution. At this time, the metal ion solution was sprayed in such a way that the temperature of the reducing agent solution was maintained at 160° C. or higher. Next, the reducing agent solution into which the metal ion solution was added was centrifuged to separate the reaction product (fine particles).

Example 4

In Example 4, alloy fine particles containing silver and rhodium in an atomic ratio of approximately 25:75 were produced by spraying the solution 11.

First, polyvinylpyrrolidone (1.0 mmol) was dissolved in ethylene glycol (200 ml) to obtain a reducing agent solution (liquid 12). Silver acetate (0.025 mmol) and rhodium (III) acetate (0.075 mmol) were dissolved in 20 ml of pure water to obtain a metal ion solution (solution 11).

Next, the reducing agent solution was heated, and when the temperature of the reducing agent solution reached 160° C., the metal ion solution was sprayed with a spray gun onto the reducing agent solution. At this time, the metal ion solution was sprayed in such a way that the temperature of the reducing agent solution was maintained at 160° C. or higher. Next, the reducing agent solution into which the metal ion solution was added was centrifuged to separate the reaction product (fine particles).

Figure 7:
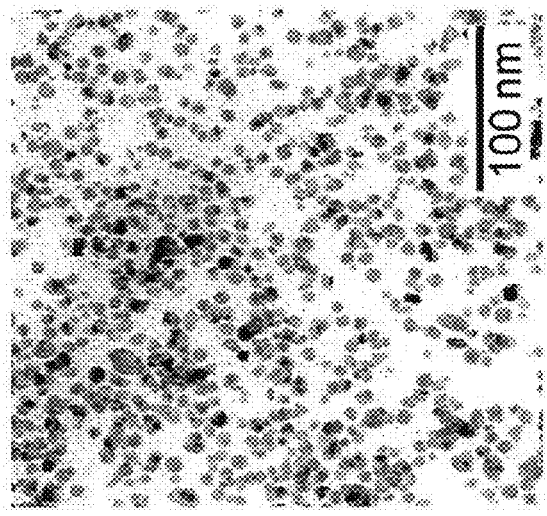
FIG. 7 shows transmission electron micrographs of alloy fine particles produced in Examples 2 to 4.
Figure 7:
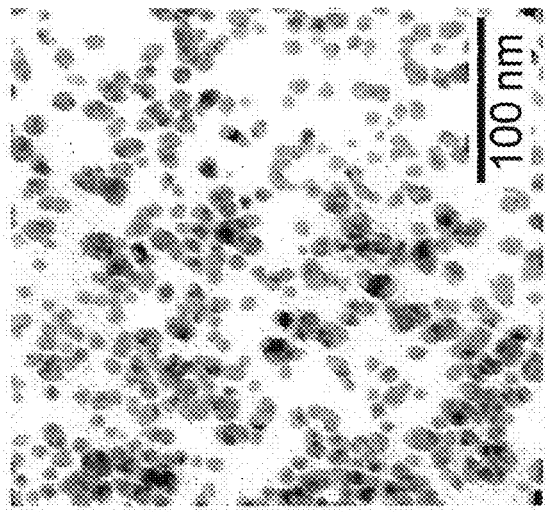
Figure 7:
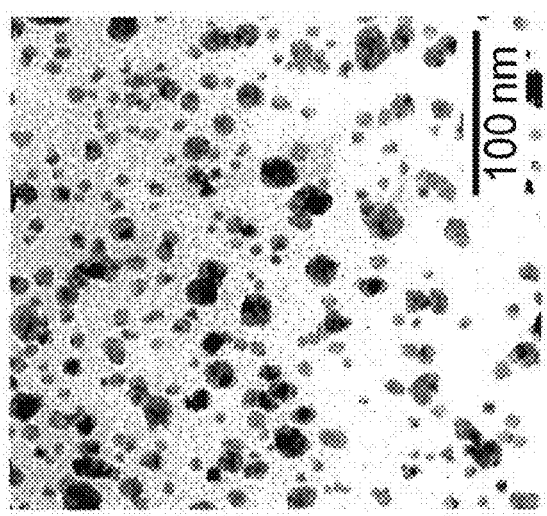

FIG. 7 shows the transmission electron micrographs of the fine particles of Examples 2 to 4. As shown in FIG. 7, the particle size increases as the proportion of silver increases under the same conditions.

Figure 8:
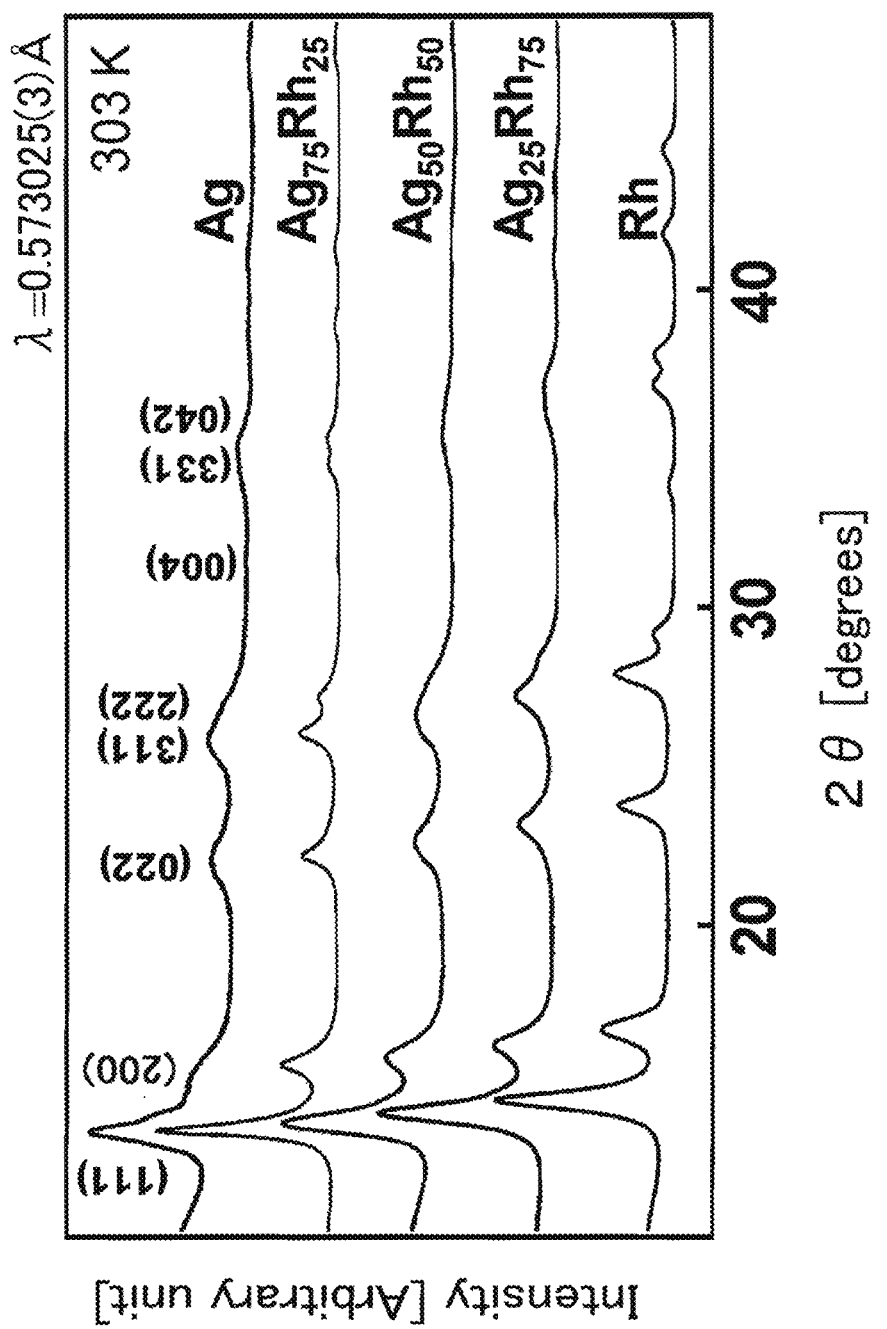
FIG. 8 shows XRD patterns of the alloy fine particles produced in Examples 2 to 4.
Figure 9:
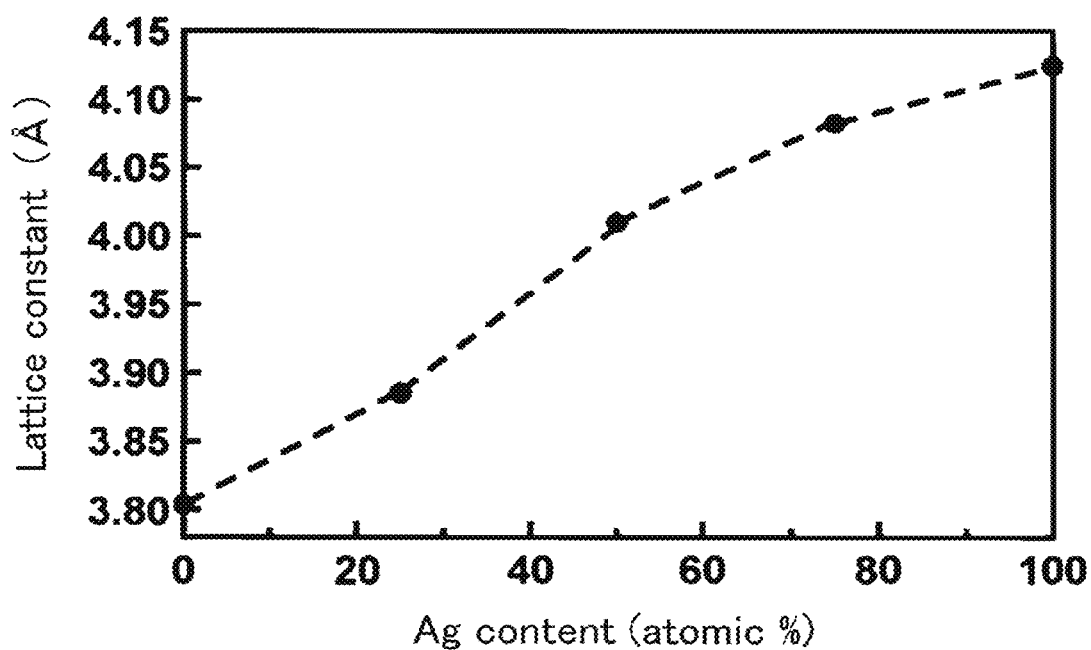
FIG. 9 is a graph showing the relationship between the silver contents and the lattice constants of the alloy fine particles produced in Examples 2 to 4.

FIG. 8 shows the XRD patterns of the fine particles of Examples 2 to 4. FIG. 8 also shows the results of silver fine particles and rhodium fine particles. The results shown in FIG. 8 indicate that the fine particles of Examples 2 to 4 are solid solution alloy fine particles and that all of the fine particles of Examples 2 to 4 have an fcc structure. FIG. 9 shows the lattice constants estimated from the results of the X-ray diffraction measurements. As shown in FIG. 9, the lattice constant increases continuously as the silver content increases.

Figure 10:
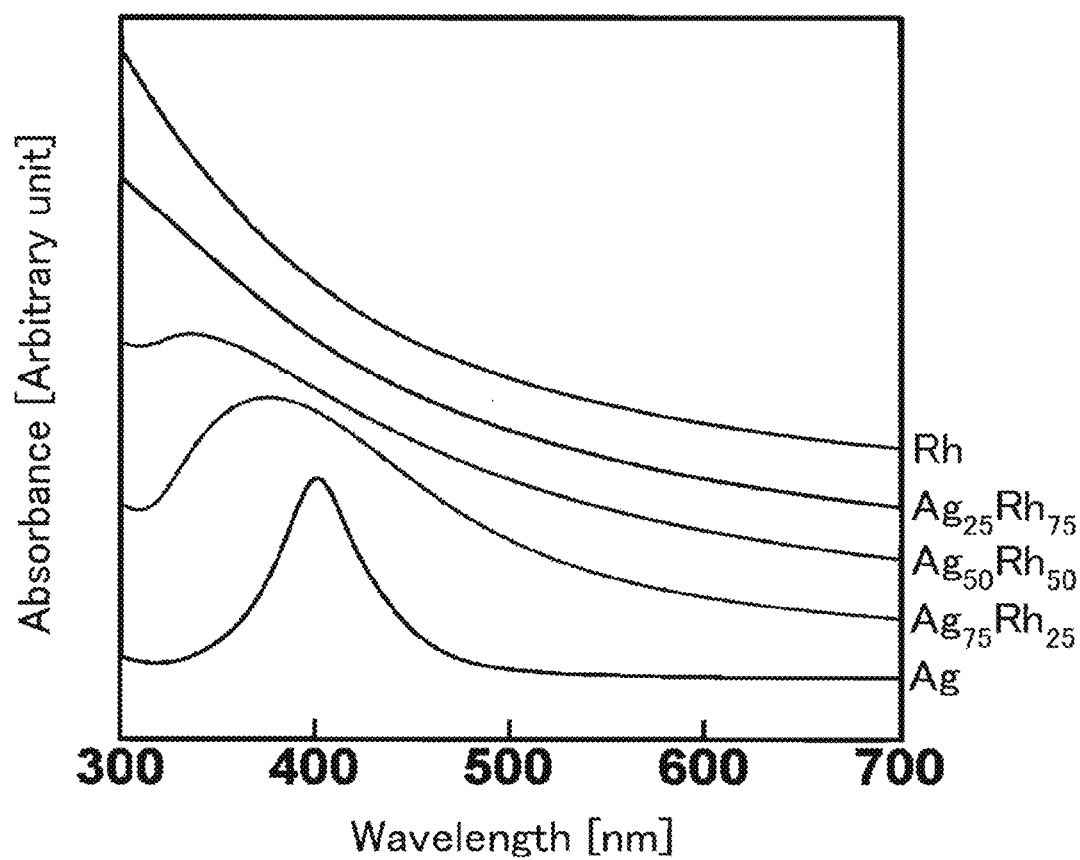
FIG. 10 shows absorption spectra of the alloy fine particles produced in Examples 2 to 4.

FIG. 10 shows the measurement results of the absorption spectra of the fine particles of Examples 2 to 4. FIG. 10 also shows the absorption spectra of silver fine particles and rhodium fine particles. In the absorption spectrum of silver fine particles, an absorption peak due to the surface plasma absorption appears around 400 nm. On the other hand, in the cases of the fine particles of Examples 2 to 4, the absorption peak shifts to the shorter wavelengths and becomes broader as the rhodium content increases. This result also suggests that silver-rhodium alloy fine particles in which silver and rhodium form a solid solution at the atomic level were obtained.

The above results demonstrate that the fine particles of Examples 1 to 4 are solid solution alloy fine particles in which silver and rhodium are mixed at the atomic level.

Comparative Example 1

In Comparative Example 1, fine particles were produced by adding the solution 11 to the liquid 12 in advance and then the resulting mixed solution was heated from about room temperature (about 20° C.) to 140° C.

First, polyvinylpyrrolidone (10 mmol) was dissolved in ethylene glycol (100 ml) to obtain a reducing agent solution (liquid 12). Silver acetate (0.5 mmol) and rhodium (III) acetate (0.5 mmol) were dissolved in 10 ml of pure water to obtain a metal ion solution (solution 11).

Next, the metal ion solution was added to the reducing agent solution, and then the resulting mixed solution was heated to 140° C. with stirring. Then, the mixed solution was stirred for one hour with its temperature maintained at 140° C. Next, after the reaction, the mixed solution was centrifuged to separate the reaction product (fine particles).

Figure 11:
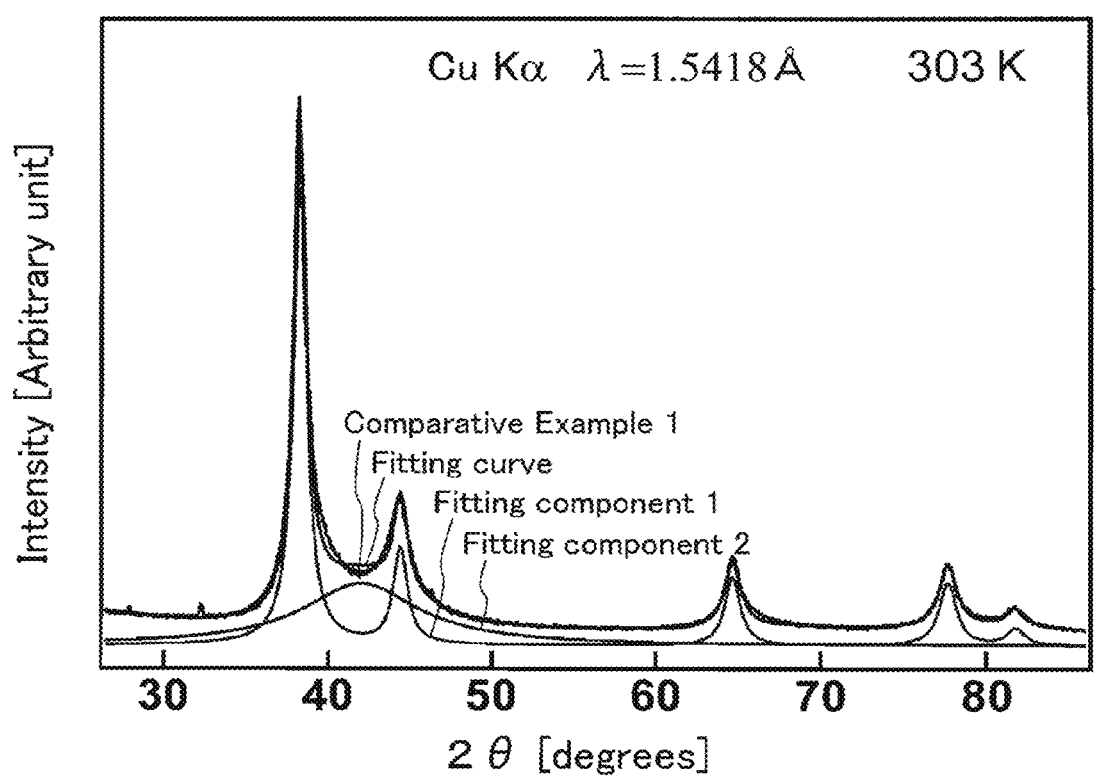
FIG. 11 shows an XRD pattern of fine particles produced in Comparative Example 1.

FIG. 11 shows the XRD pattern of the fine particles of Comparative Example 1. FIG. 11 also shows a curve fitted using fitting components 1 and 2. The fitting component 1 is a component having a lattice constant of 4.08 angstroms and a particle size of 9.7 nm. The fitting component 2 is a component having a lattice constant of 3.73 angstroms and a particle size of 1.1 nm. The lattice constant of the fitting component 1 is close to that of bulk silver (i.e., 4.086 angstroms) and the lattice constant of the fitting component 2 is close to that of bulk rhodium (i.e., 3.803 angstroms). From the result shown in FIG. 11, it is believed that the fine particles of Comparative Example 1 are core-shell fine particles having a silver core or fine particles in which silver and rhodium are phase-separated.

Comparative Example 2

First, polyvinylpyrrolidone (0.15 mmol) was dissolved in ethylene glycol (100 ml) to obtain a reducing agent solution (liquid 12). Silver acetate (0.03 mmol) and rhodium (III) acetate (0.03 mmol) were dissolved in 20 ml of pure water to obtain a metal ion solution (solution 11).

Next, the reducing agent solution was heated, and when the temperature of the reducing agent solution reached 140° C., the metal ion solution was dropped with a syringe into the reducing agent solution. At this time, the reducing agent solution was dropped in such a way that the temperature of the reducing agent solution was maintained at 140° C. Next, the reducing agent solution into which the metal ion solution was dropped was centrifuged to separate the reaction product (fine particles).

Figure 12:
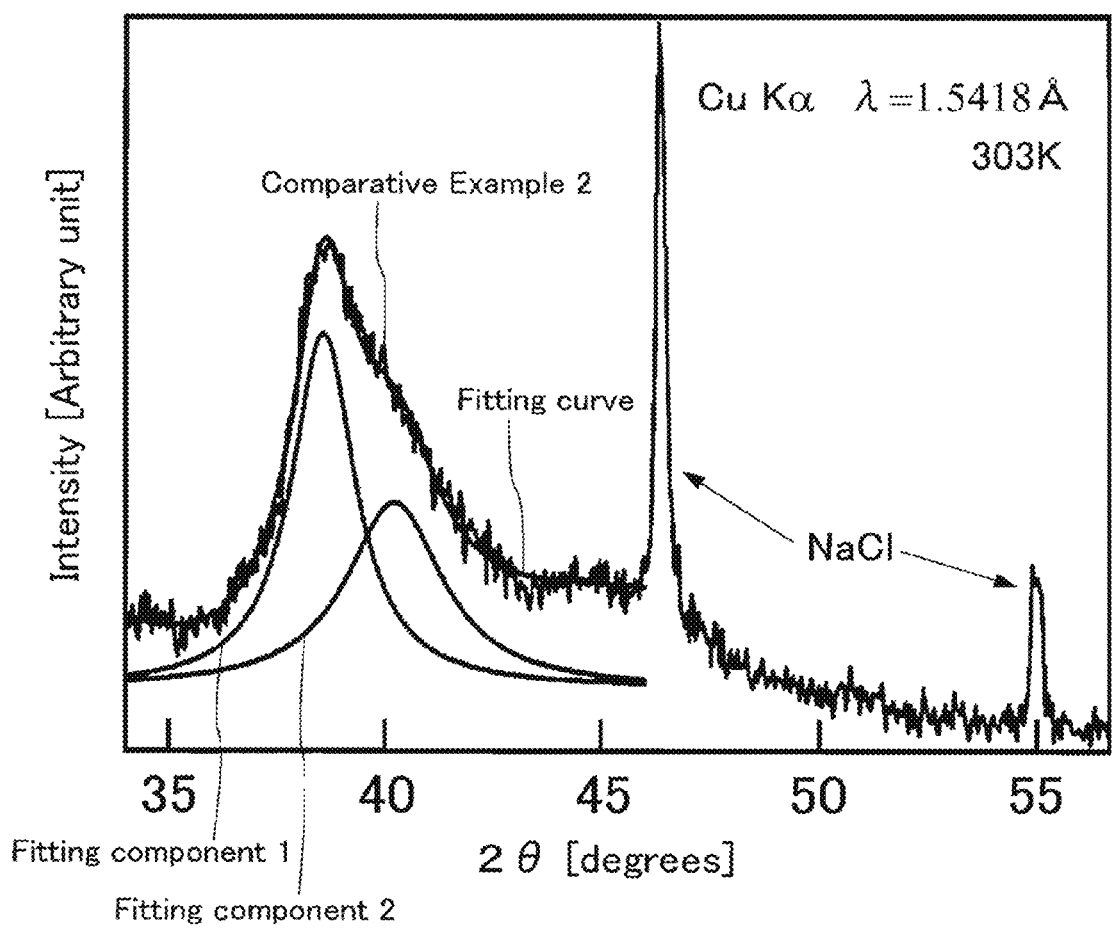
FIG. 12 shows an XRD pattern of fine particles produced in Comparative Example 2.

FIG. 12 shows the XRD pattern of the fine particles of Comparative Example 2. FIG. 12 also shows a curve fitted using fitting components 1 and 2. The fitting component 1 is a component having a lattice constant of 4.04 angstroms and a particle size of 5.3 nm. The fitting component 2 is a component having a lattice constant of 3.89 angstroms and a particle size of 3.5 nm. In the XRD pattern of the fine particles of Comparative Example 2, the peak is not that of a single fcc structure but is composed of two components. The lattice constant of the fitting component 1 is close to that of silver, and the lattice constant of the fitting component 2 is close to that of bulk rhodium. Therefore, it is believed that silver and rhodium are phase-separated in the fine particles of Comparative Example 2.

Comparative Example 3

First, polyvinylpyrrolidone (0.1 mmol) was dissolved in ethylene glycol (100 ml) to obtain a reducing agent solution (liquid 12). Silver acetate (0.005 mmol) and rhodium (III) acetate (0.005 mmol) were dissolved in 20 ml of pure water to obtain a metal ion solution (solution 11).

Figure 13:
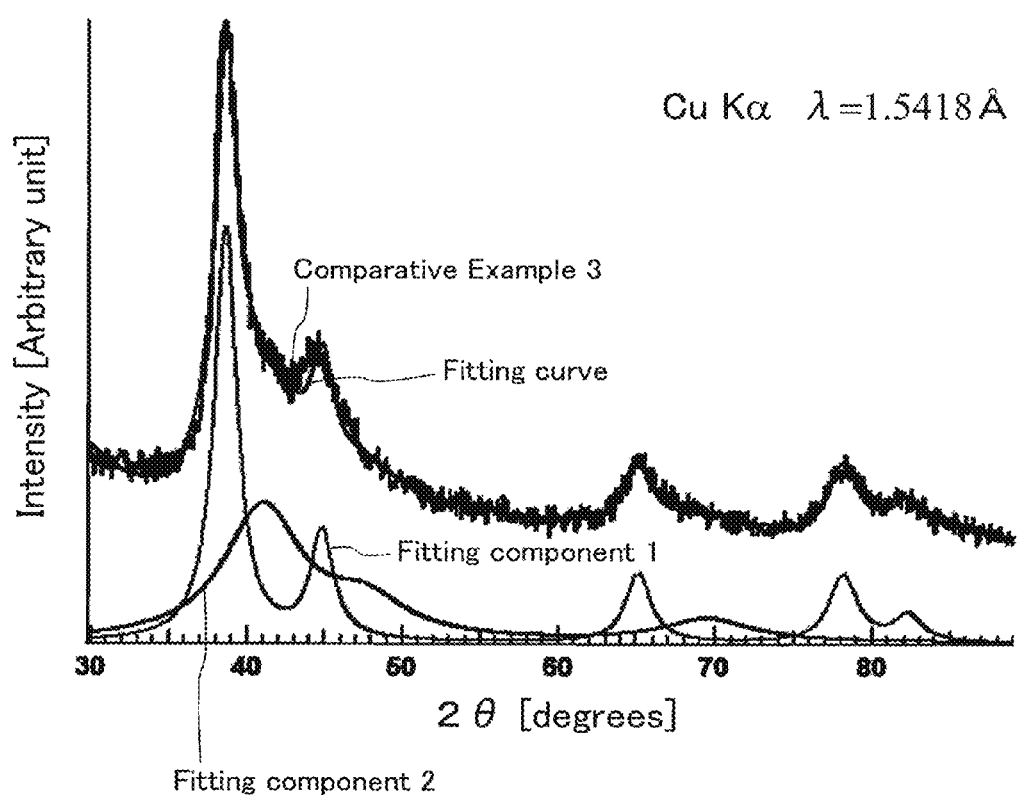
FIG. 13 shows an XRD pattern of fine particles produced in Comparative Example 3.

Next, the metal ion solution at room temperature was dropped with a syringe into the reducing agent solution at room temperature (about 20° C.). Next, the reducing agent solution into which the metal ion solution was dropped was heated to reflux with stirring at 160° C. for one hour. Next, the heated solution was centrifuged to separate the reaction product (fine particles). FIG. 13 shows the X-ray diffraction pattern of the fine particles thus obtained. In FIG. 13, the fitting component 1 is a component having a lattice constant of 4.070 angstroms and a particle size of 5.4 nm. The fitting component 2 is a component having a lattice constant of 3.842 angstroms and a particle size of 1.6 nm. From the X-ray diffraction pattern of FIG. 13, it is believed that silver and rhodium are phase-separated in the fine particles of Comparative Example 3.

Example 5

In Example 5, gold-rhodium alloy fine particles were produced by spraying the solution 11.

First, polyvinylpyrrolidone (1.0 mmol) was dissolved in ethylene glycol (200 ml) to obtain a reducing agent solution (liquid 12). Chloroauric acid (0.05 mmol) and rhodium (III) chloride (0.05 mmol) were dissolved in 20 ml of pure water to obtain a metal ion solution (solution 11).

Next, the reducing agent solution was heated, and when the temperature of the reducing agent solution reached 160° C., the metal ion solution was sprayed with a spray gun onto the reducing agent solution. At this time, the metal ion solution was sprayed in such a way that the temperature of the reducing agent solution was maintained at 160° C. or higher. Next, the reducing agent solution onto which the metal ion solution was sprayed was centrifuged to separate the reaction product (fine particles of Example 5).

Figure 14:
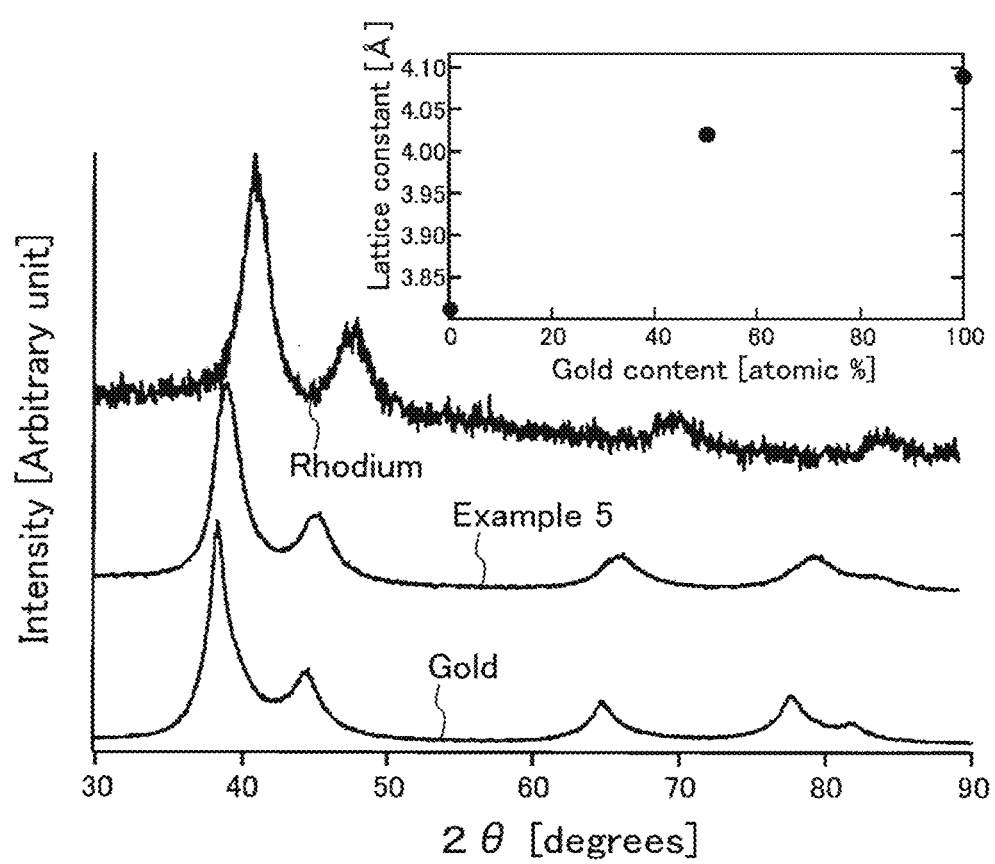
FIG. 14 shows an XRD pattern of alloy fine particles produced in Example 5.
Figure 15:
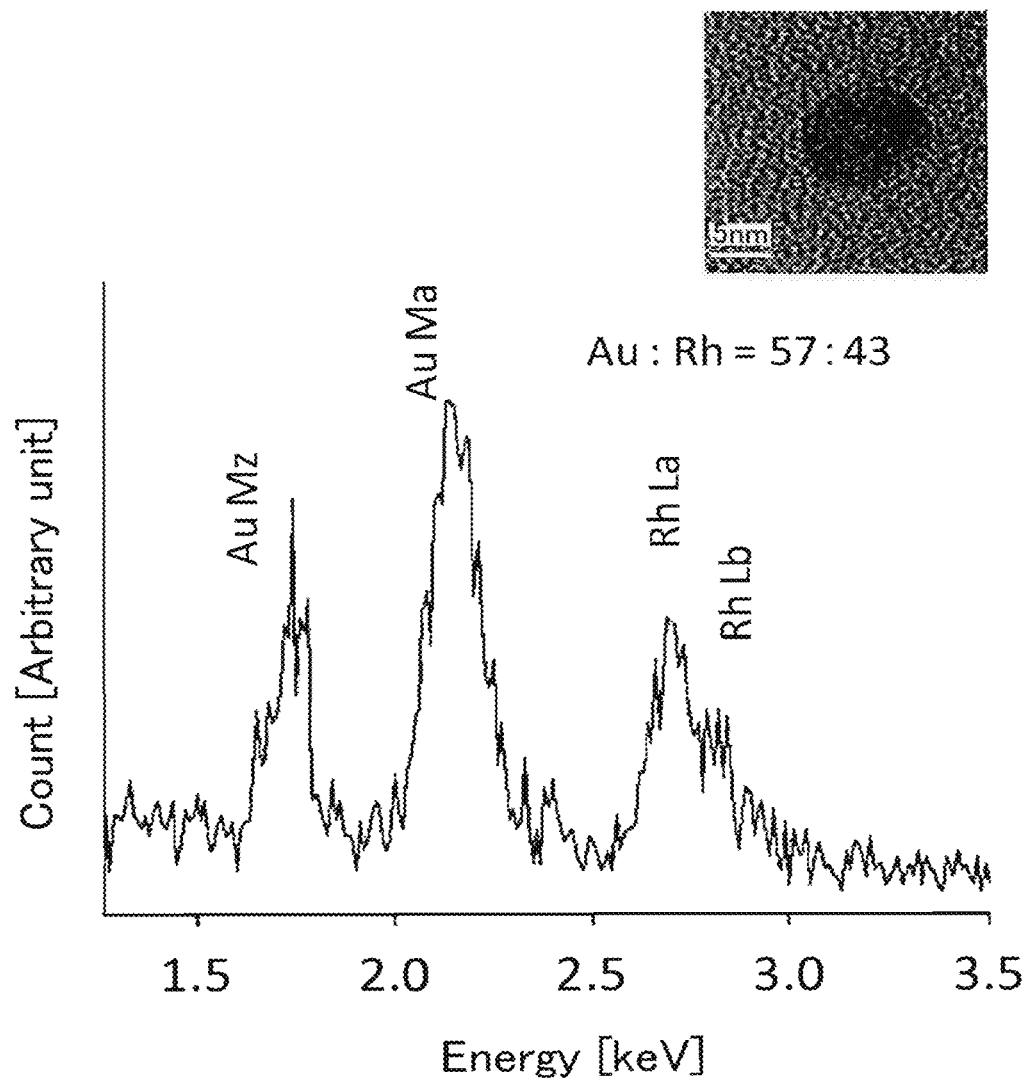
FIG. 15 shows an EDX spectrum and an electron micrograph of the alloy fine particle produced in Example 5.

FIG. 14 shows the X-ray diffraction pattern of the fine particles of Example 5. FIG. 15 shows the EDX spectrum of the fine particles of Example 5. FIG. 15 also shows an electron micrograph of a measured fine particle. Not only the XRD pattern of Example 5 indicates a single fcc pattern but also its lattice constant has a value between the lattice constant of gold nanoparticles and that of rhodium nanoparticles. These facts prove that gold and rhodium form a solid solution at the atomic level. Furthermore, the EDX spectrum confirms that both of the elements, i.e., gold and rhodium, are present in one particle.

[Observation with STEM]

Figure 16A:
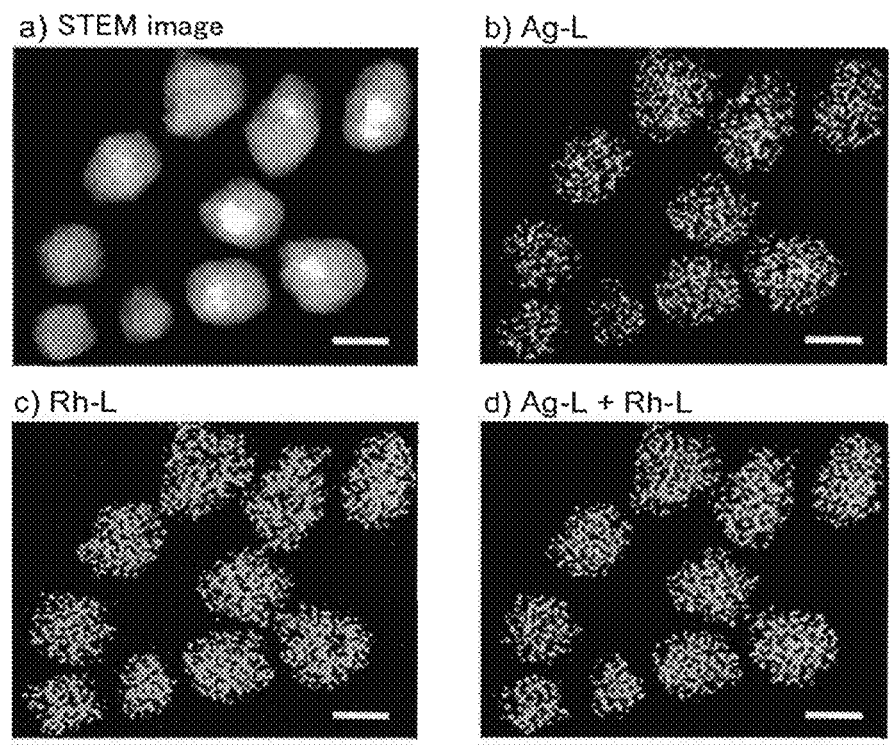
FIG. 16A and FIG. 16B show the results obtained by observing the alloy fine particles produced in Example 1 with a scanning transmission electron microscope (STEM).
Figure 16B:
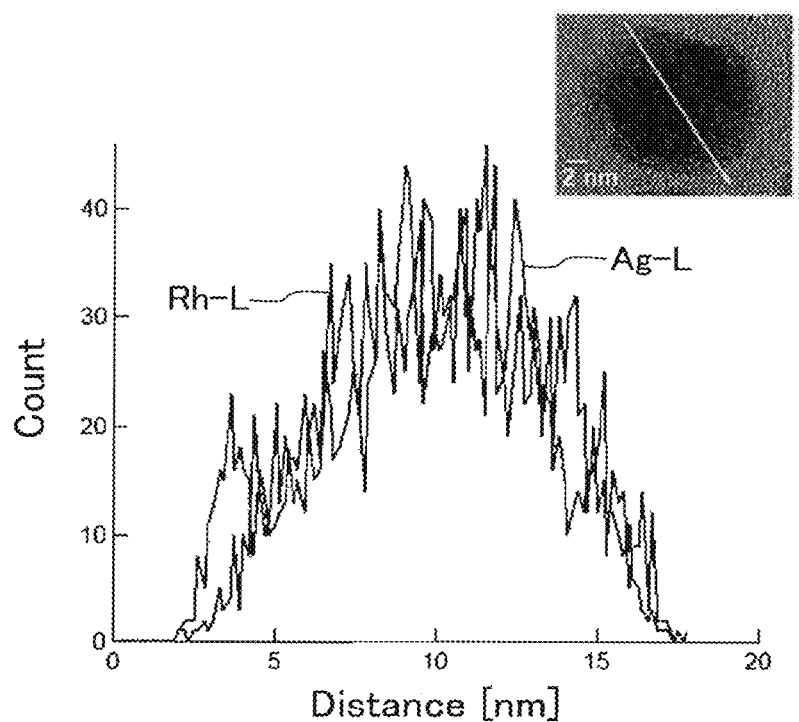

The silver-rhodium alloy fine particles of Example 1 were observed using a scanning transmission electron microscope (STEM). FIG. 16A and FIG. 16B show the data of the fine particles of Example 1. In FIG. 16A, a) shows a dark-field STEM image, and b) to d) show elemental mapping data. FIG. 16B shows the result of line analysis. A scale bar in each of the images in FIG. 16A indicates 10 nm. FIG. 16A shows that all of the particles form a solid solution. Furthermore, FIG. 16B shows that the individual elements are not locally present in a particle but both of the elements are uniformly distributed across the particle. In other words, the data of FIG. 16A and FIG. 16B indicate that silver and rhodium form a solid solution at the atomic level in the fine particles of Example 1.

Figure 17A:
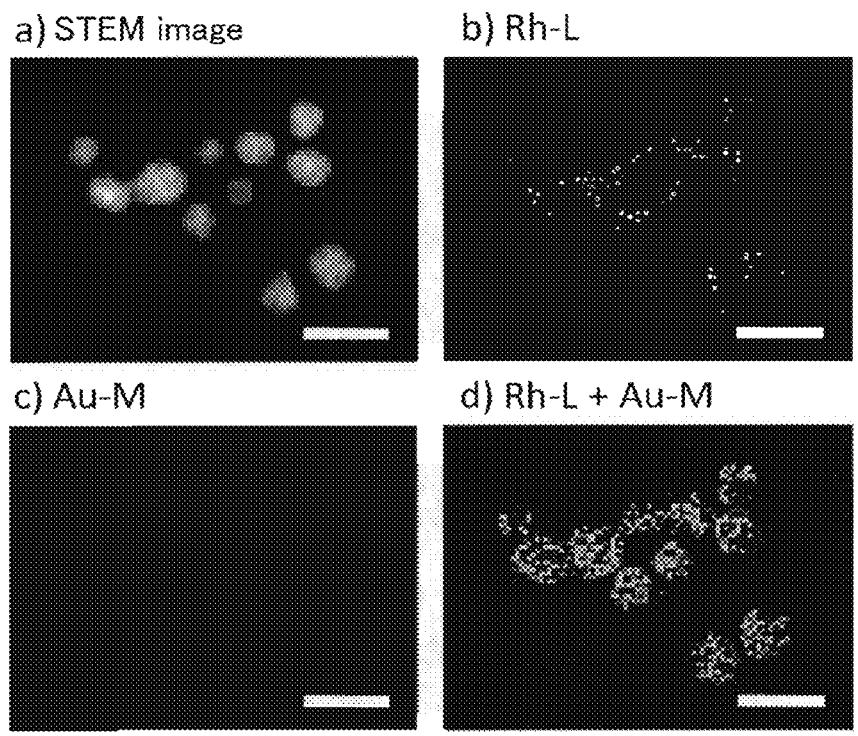
FIG. 17A and FIG. 17B show the results obtained by observing the alloy fine particles produced in Example 5 with a scanning transmission electron microscope.
Figure 17B:
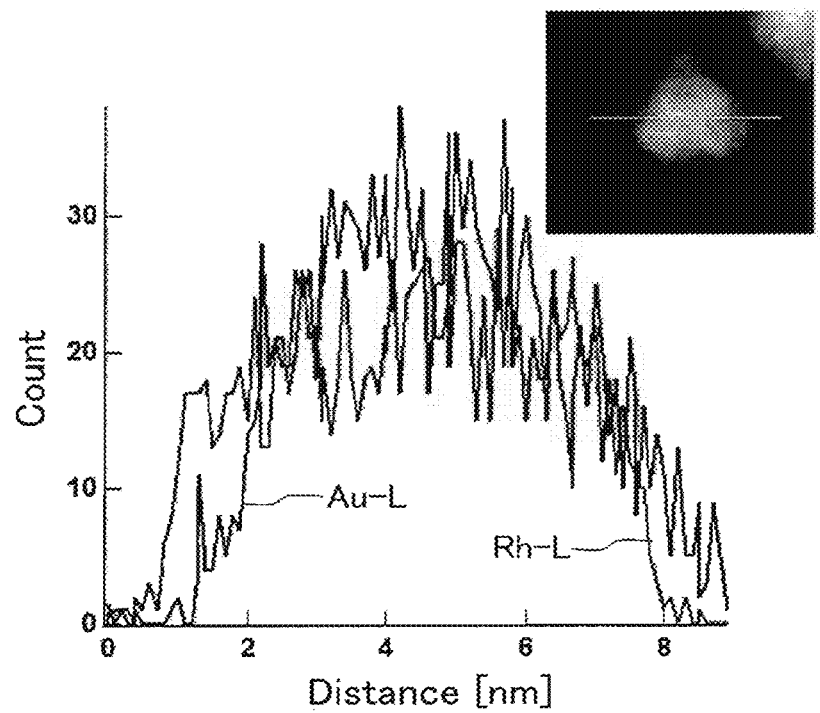
Figure 18:
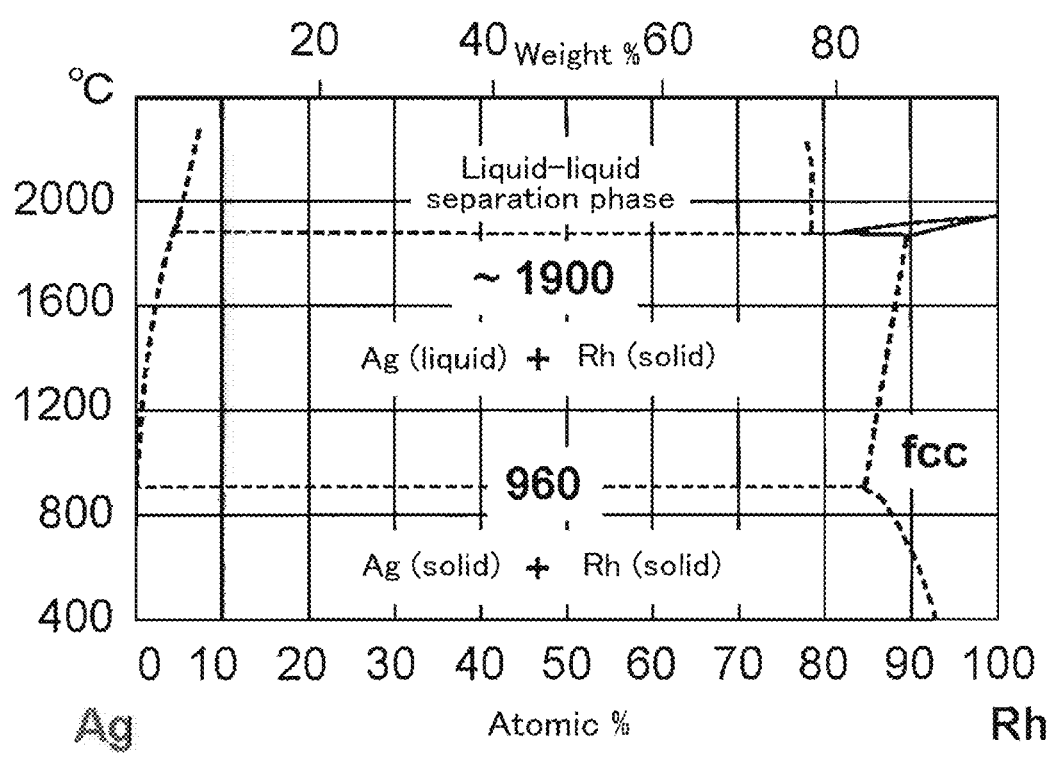
FIG. 18 is a phase diagram of silver and rhodium.
Figure 19:
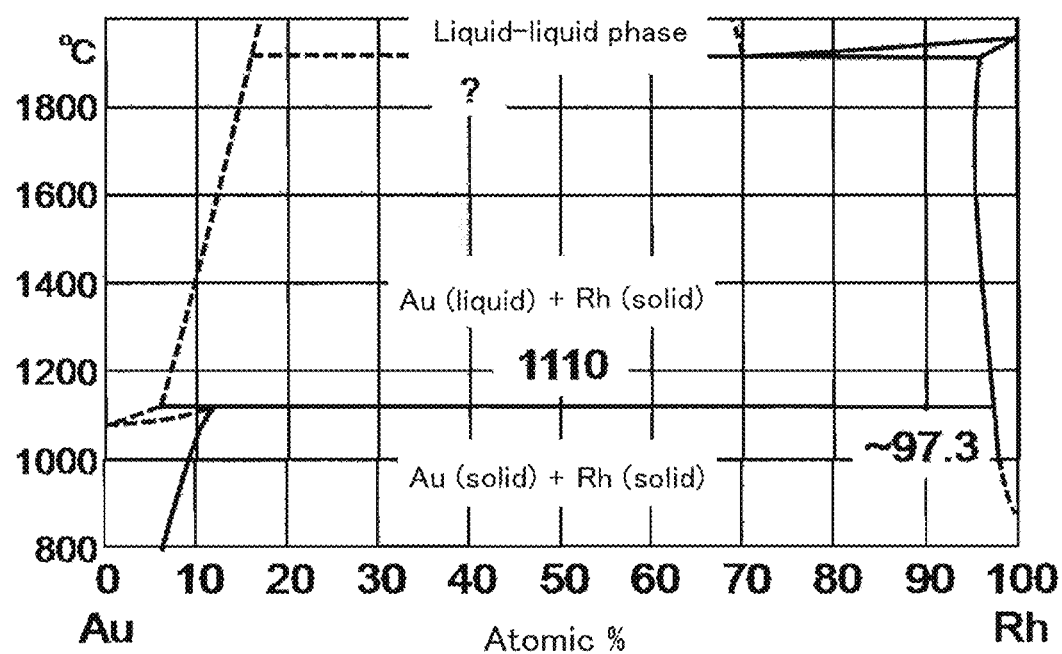
FIG. 19 is a phase diagram of gold and rhodium.

The fine particles of Example 5 were observed using a STEM. FIG. 17A and FIG. 17B show the data thus obtained. In FIG. 17A, a) shows a dark-field STEM image, and b) to d) show elemental mapping data. FIG. 17B shows the result of line analysis. A scale bar in each of the images in FIG. 17A indicates 10 nm. FIG. 17A shows that all of the particles form a solid solution. Furthermore, FIG. 17B shows that the individual elements are not locally present in a particle but both of the elements are uniformly distributed across the particle. In other words, the data of FIG. 17A and FIG. 17B indicate that gold and rhodium form a solid solution at the atomic level in the fine particles of Example 5.

As shown in the above examples, according to the production method of the present invention, silver-rhodium fine particles in which silver and rhodium form a solid solution and gold-rhodium fine particles in which gold and rhodium form a solid solution were obtained. No data have been presented to indicate that these elements are mixed at the atomic level. The present inventors have presented the first data indicating that these elements are mixed at the atomic level.

INDUSTRIAL APPLICABILITY

According to the present invention, solid solution alloy fine particles in which a plurality of metal elements are mixed at the atomic level are obtained. These alloy fine particles can be used for various applications (for example, catalysts). For example, silver-rhodium alloy fine particles can be used as a catalyst for organic synthesis, an electrode catalyst for a fuel cell, and a catalyst for reducing $NO_x$. Furthermore, since silver-rhodium alloy fine particles are considered to exhibit hydrogen storage properties, they are expected to be applied to various devices by taking advantage of their hydrogen storage properties. Silver-rhodium alloy fine particles in which silver and rhodium form a solid solution at the atomic level are expected to exhibit the properties similar to those of palladium. Likewise, it is possible to produce alloys having various properties by producing alloys of various elements.

The invention claimed is:

1. A method for producing alloy fine particles composed of a plurality of metal elements, the method comprising the steps of:
    (i) preparing a solution containing ions of the plurality of metal elements and a liquid containing a reducing agent; and
    (ii) mixing the solution with the liquid that has been heated, wherein
the plurality of metal elements are a plurality of metal elements that do not form a solid solution even in the liquid phase,
    the reducing agent is ethylene glycol,
    the plurality of metal elements are silver and rhodium, and
    in the step (ii), the solution is mixed with the liquid that has been heated to 145° C. or higher.

2. The production method according to claim 1, wherein in the step (ii), the solution is mixed with the liquid that has been heated to a temperature not lower than a temperature at which each of the ions of the plurality of metal elements is reduced.

3. The production method according to claim 2, wherein in the step (ii), the solution is mixed with the liquid that has been heated to a temperature higher by 20° C. or more than a temperature at which each of the ions of the plurality of metal elements is reduced.

4. The production method according to claim 1, wherein at least one selected from the liquid and the solution contains a protective agent for preventing agglomeration of the alloy fine particles.

5. The production method according to claim 1, wherein in the step (ii), the solution is mixed with the liquid by dropping the solution into the liquid.

6. The production method according to claim 1, wherein in the step (ii), the solution is mixed with the liquid by spraying the solution onto the liquid.

7. A method for producing alloy fine particles composed of a plurality of metal elements, the method comprising the steps of:
  (i) preparing a solution containing ions of the plurality of metal elements and a liquid containing a reducing agent; and
  (ii) mixing the solution with the liquid that has been heated, wherein
  the plurality of metal elements are a plurality of metal elements that do not form a solid solution even in the liquid phase,
  the reducing agent is ethylene glycol, and
  in the step (ii), the solution is mixed with the liquid that has been heated to a temperature higher by 20° C. or more than a temperature at which each of the ions of the plurality of metal elements is reduced.

8. The production method according to claim 7, wherein the plurality of metal elements are silver and rhodium, and
  in the step (ii), the solution is mixed with the liquid that has been heated to 145° C. or higher.

9. The production method according to claim 7, wherein the plurality of metal elements are gold and rhodium.

10. The production method according to claim 7, wherein at least one selected from the liquid and the solution contains a protective agent for preventing agglomeration of the alloy fine particles.

11. The production method according to claim 7, wherein in the step (ii), the solution is mixed with the liquid by dropping the solution into the liquid.

12. The production method according to claim 7, wherein in the step (ii), the solution is mixed with the liquid by spraying the solution onto the liquid.

13. A method for producing alloy fine particles composed of a plurality of metal elements, the method comprising the steps of:
  (i) preparing a solution containing ions of the plurality of metal elements and a liquid containing a reducing agent; and
  (ii) mixing the solution with the liquid that has been heated, wherein
  the plurality of metal elements are a plurality of metal elements that do not form a solid solution even in the liquid phase, and
  in the step (ii), the solution is mixed with the liquid by spraying the solution onto the liquid.

14. The production method according to claim 13, wherein the reducing agent is at least one type of alcohol selected from the group consisting of ethylene glycol, diethylene glycol, and triethylene glycol.

15. The production method according to claim 13, wherein the reducing agent is ethylene glycol, and
  in the step (ii), the solution is mixed with the liquid that has been heated to a temperature not lower than a temperature at which each of the ions of the plurality of metal elements is reduced.

16. The production method according to claim 13, wherein the plurality of metal elements are gold and rhodium.

17. The production method according to claim 13, wherein at least one selected from the liquid and the solution contains a protective agent for preventing agglomeration of the alloy fine particles.

* * * * *